June 2, 1931.                J. T. MOORE                1,807,925
                              LINK BELT
                          Filed Feb. 26, 1929
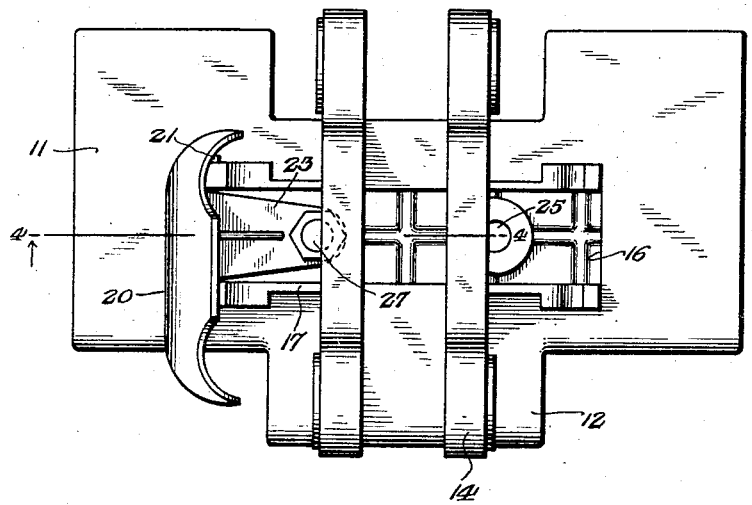
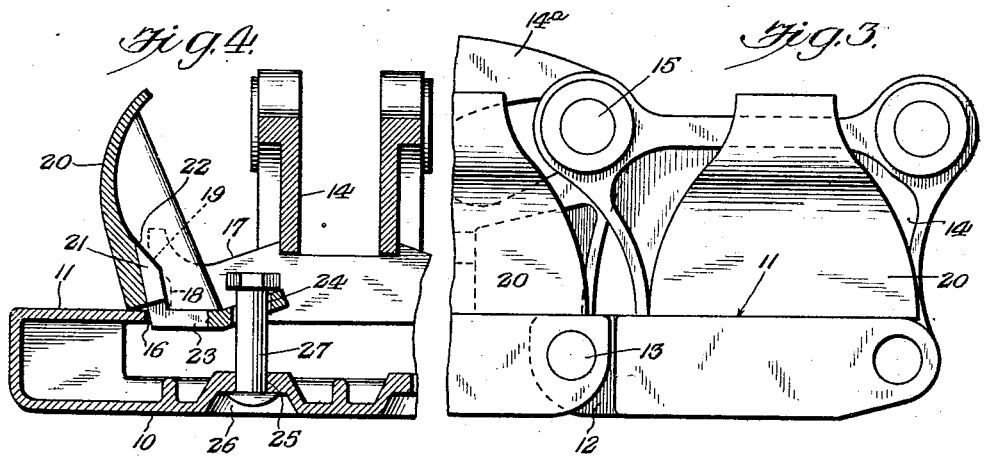
Inventor
J. T. Moore,
By Church & Church
       his Attorneys Patented June 2, 1931

1,807,925

UNITED STATES PATENT OFFICE

JOHN TURNER MOORE, OF READING, PENNSYLVANIA, ASSIGNOR, BY MESNE ASSIGNMENTS, TO REX-WATSON CORPORATION, OF CANASTOTA, NEW YORK, A CORPORATION OF NEW YORK

LINK BELT

Application filed February 26, 1929. Serial No. 342,813.

This invention relates to improvements in link belts adapted to form an endless track or tread for vehicles, such track or tread facilitating movement of the vehicle over soft or rough ground. More specifically, the invention relates to the links constituting such endless belt or track.

The links of such endless belts or tracks have an outer ground engaging or tread surface and an inner surface on which the supporting wheels of the vehicle ride and in order to keep the links properly alined with the said wheels they are usually formed with guide members on their wheel supporting surfaces for limiting lateral movement of said links with respect to said wheels. Said guides usually engage the wheels at the peripheries of the latter and constantly have wear imposed thereon during use of the vehicle. After the guides have become worn to such an extent that too much lateral movement is allowed the links the latter must be removed from the belt and replaced with new ones. In order to obviate this loss of the entire link, the present invention contemplates the provision of a link with a detachable or removable wheel guiding member.

More particularly, the invention consists in a removable guide member fulcrumed on the link by fastening means that will rock it on its fulcrum and clamp it securely against abutments on the link.

With these and other objects in view the invention consists in certain details of construction and combinations and arrangements of parts, all as will hereinafter be more fully described and the novel features thereof particularly pointed out in the appended claims.

In the accompanying drawing illustrating the preferred embodiment of the invention, Figure 1 is an end elevation of one of the links with the guide member at one side removed, and the wheels shown in outline;

Fig. 2 is a top plan view of the link shown in Fig. 1;

Fig. 3 is a side elevation, two links being shown connected together;

Fig. 4 is a sectional view on the line 4—4 of Fig. 2;

Fig. 5 is a detail view of the detachable guide.

In accordance with usual practice, the body of the link, whose outer or bottom surface 10 forms the tread surface and whose upper or inner surface has a wheel supporting surface 11 at each side thereof, is formed with extensions 12 at its ends through which hinge pins 13 extend for connecting two juxtaposed links together. Each alternate link is also formed with two upstanding ribs or truss members 14 intermediate the wheel supporting surfaces, these ribs or truss members overlapping the rib or truss member 14a of juxtaposed links to which they are also connected by pins 15. These portions of the links and the connections between the links may, however, take any desired construction and do not form any part of the present invention.

Preferably, the links are hollow and in their inner walls are openings 16 intermediate the truss ribs and wheel supporting surfaces. Extending transversely of the links at each side of each openings 16 is a web 17 projecting upwardly from the wheel supporting surfaces, the lower portions of said webs being undercut as at 18 to form a beveled surface 19.

Seating on the wheel supporting surfaces and capable of being rocked thereon, are the wheel guide members whose body portions 20 may generally be of any desired cross-section. Preferably, their upper portions are offset inwardly and on their inner surfaces are lugs 21 adapted to engage in the undercut portions of webs 17, said lugs being formed with reversely beveled surfaces 22 adapted to engage the beveled surfaces 19 on said ribs or webs 17.

At the bottom of each guide member is a lateral extension 23 whose extremity is formed with a bolt hole 24 adapted to register with a hole 25 in the link tread, said tread having a countersink 26 therein around each of said holes 25. Bolts 27 extend through the alined holes for securing the guides to the links. It will be noted that the points at which the guide engages the wheel surface 11 and the point at which the extension 23 is secured to tread 10 are disposed at opposite sides of the abutments formed by webs 17. This results in the guides being rocked on the fulcrums when the nuts on bolts 27 are tightened, said guides being drawn toward the webs 17 and the reversely beveled surfaces 19 and 22 being wedged or clamped together, thereby firmly supporting the guides on the links.

As will be appreciated, if a guide becomes worn to such an extent that it does not maintain the link in proper alinement laterally of the wheels, all that is necessary is to remove bolt 27 and substitute a new guide.

What I claim is:

1. A link for endless track belts, said link having a tread surface and a wheel supporting surface, a guide member having a body portion fulcrumed on the wheel supporting surface, an extension on said guide body, and a bolt extending through the tread surface and engaging said extension at a point spaced from one side edge of said wheel supporting surface for securing said guide to the link and means on said link engaging said guide for preventing movement of the latter in conjunction with said bolt.

2. A link for endless track belts having inner and outer walls, the latter constituting the tread surface and the former having wheel supporting surfaces thereon, there being openings in said inner wall, a guide member seating on the inner wall of the link, an extension on said guide projecting through one of said openings and means for securing said extension to said outer wall.

3. A link for endless track belts having spaced inner and outer walls, the latter for the tread surface and the former having wheel supporting surfaces thereon, a guide member seating on the inner wall of the link, said outer wall having a countersunk opening therein, an extension on said guide projecting into the space between said inner and outer walls and having an opening therein in registry with the opening in the outer wall of the link, and means extending through said openings for detachably securing said guide to the link.

4. A hollow link for endless track belts having inner and outer walls, the former forming a wheel supporting surface and the latter constituting the tread surface of the link, an upstanding guide seating on said wheel supporting surface, an extension on said guide projecting into the interior of the link, and means extending through said extension and outer wall for detachably clamping the guide against said inner wall.

5. A link for endless track belts having a wheel supporting surface, a guide seating on said surface, abutments extending above said surface, and detachable means for engaging the guide at a point beyond the edge of said supporting surface for forcing said guide toward and against said surface and said abutments.

6. A link for endless track belts having a tread portion and a wheel supporting surface with a recess in said surface, a guide member extending above said surface and projecting into said recess, and means engaging the projecting portion of said guide member for detachably securing said member to the tread portion of the link.

7. A link for endless track belts having a tread portion and a wheel supporting surface, a guide member fulcrumed on said surface, detachable fastening means engaging said member to rock the latter on its fulcrum, and abutments against which said member is clamped by said fastening member.

8. A link for endless track belts having a tread portion and a wheel supporting surface, a guide member fulcrumed on said link and projecting above said surface, abutments above said surface, and fastening means engaging said member for rocking the same on its fulcrum and clamping it against said abutments.

9. A link for endless track belts having a tread portion and a wheel supporting surface with a recess in the latter, a guide member fulcrumed on said surface, a lateral extension on said guide member projecting into said recess, fastening means engaging said extension to rock the guide member on its fulcrum, and abutments on said link intermediate the fulcrum of the guide and the point at which said fastening means engage said extension.

10. A link for endless track belts having a tread portion and a wheel supporting surface, a guide member fulcrumed on said link, detachable fastening means engaging said member to rock it on its fulcrum, and transverse webs on said link opposing movement of said guide on its fulcrum.

11. A link for endless track belts having a tread portion and a wheel supporting surface, a guide member fulcrumed on said link, detachable fastening means engaging said guide to rock it on its fulcrum, means for limiting fulcruming movement of the guide, and cooperating wedging surfaces on said link and guide.

12. A link for endless track belts having a tread portion and a wheel supporting surface, a guide member fulcrumed on said link, detachable fastening means engaging said guide to rock it on its fulcrum, transverse webs on the link forming stops for limiting rocking movement of the guide, and cooperating wedging surfaces on said guide and webs.

JOHN TURNER MOORE.